United States Patent [19]

Suzuki et al.

[11] 4,115,868
[45] Sep. 19, 1978

[54] INFORMATION TRANSFERRING APPARATUS

[75] Inventors: Seigo Suzuki, Yokohama; Seiji Eguchi, Kawasaki; Yoshiaki Moriya, Tokyo, all of Japan

[73] Assignee: Tokyo Shibaura Electric Co., Ltd., Tokyo, Japan

[21] Appl. No.: 732,703

[22] Filed: Oct. 15, 1976

[30] Foreign Application Priority Data

Oct. 15, 1975 [JP] Japan .................... 50-124140

[51] Int. Cl.² ............................................. G06F 13/00
[52] U.S. Cl. .................................................. 364/900
[58] Field of Search .............. 340/173 R, 172.5; 364/200 MS File, 900 MS File; 365/78, 80

[56] References Cited

U.S. PATENT DOCUMENTS

| 3,470,540 | 9/1969 | Levy | 340/172.5 |
| 3,896,419 | 7/1975 | Lange et al. | 340/172.5 |
| 4,028,666 | 6/1977 | Suzuki et al. | 364/900 |

Primary Examiner—Gareth D. Shaw
Assistant Examiner—Thomas M. Heckler
Attorney, Agent, or Firm—Finnegan, Henderson, Farabow & Garrett

[57] ABSTRACT

An information transferring apparatus disposed between first and second information processing units comprises a first-in first-out stack, a first information line for transferring information from the first information processing unit to the first-in first-out stack, a second information line for transferring information from the first-in first-out stack to the second information processing unit, a third information line for transferring information from the second information processing unit to the first-in first-out stack, a fourth information line for transferring information from the first-in first-out stack to the first information processing unit, switching circuits for selectively deactivating the first to fourth information lines, and a command register for applying first and second control signals to the switching circuits, wherein the switching circuits operate responsive to the first control signal from the command register to deactivate the third and fourth information lines while holding active the first and second information lines, and operate responsive to the second control signal from the command register to deactivate the first and second information lines while holding active the third and fourth information lines. The command register may be replaced and its functions performed by either manual control or an external circuit.

4 Claims, 2 Drawing Figures

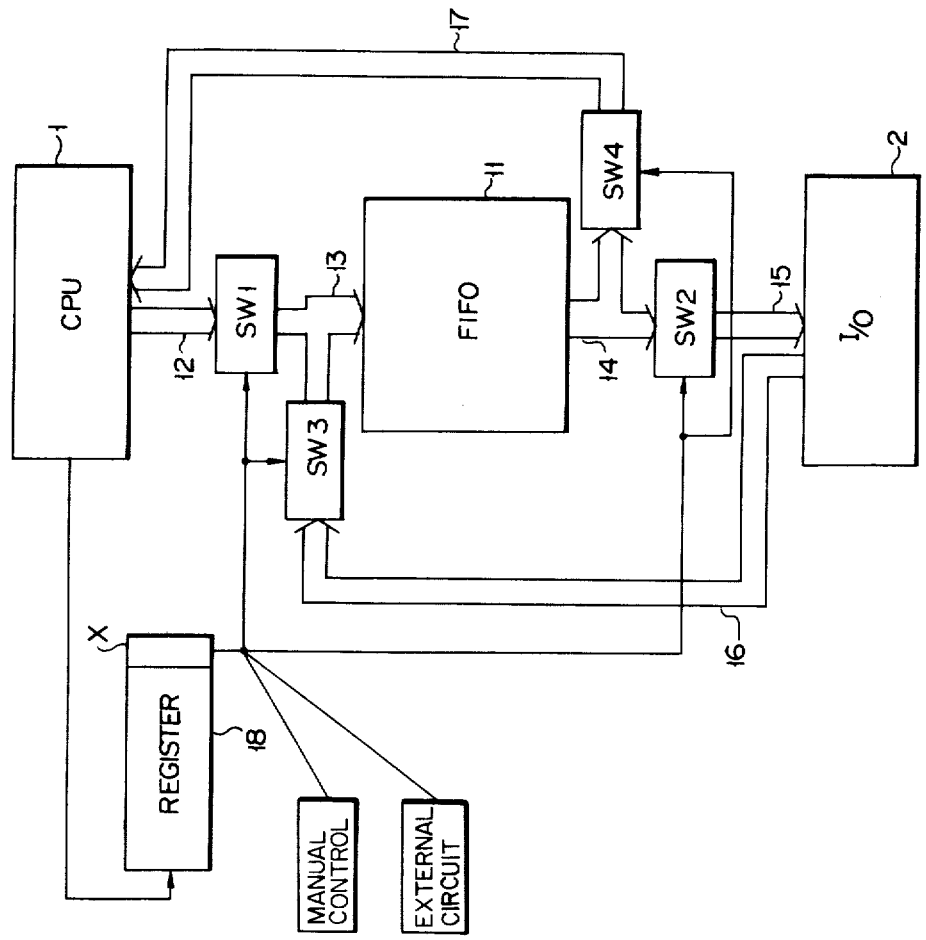
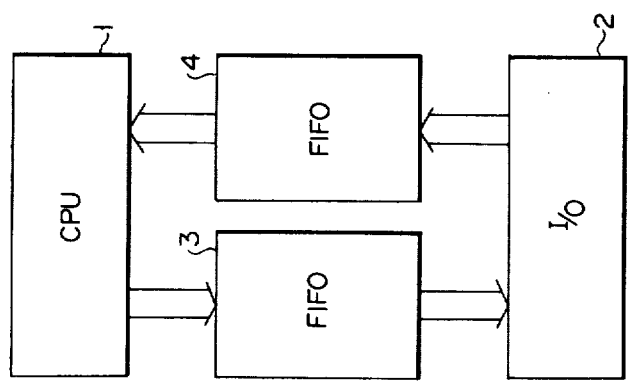
PRIOR ART

INFORMATION TRANSFERRING APPARATUS

BACKGROUND OF THE INVENTION

The present invention relates to an information transferring apparatus having a first-in first-out stack.

It is common that information processors such as minicomputers or microcomputers use first-in first-out (FIFO) stacks as a data buffer. For example, as shown in FIG. 1, a conventional information processor generally consists of a central processing unit 1, an input/output unit 2, a FIFO stack 3 for transferring the information from the central processing unit 1 to the input/output unit 2 and another FIFO stack 4 for transferring the information from the input/output unit 2 to the central processing unit 1. Generally, the information between the central processing unit and the input/output unit is bidirectionally transferred. However, in a conventional FIFO stack, the transfer direction of information is only one way. It is for this reason that two FIFO stacks have been required in the conventional information processor, as shown in FIG. 1. In this manner, the conventional information processor uses a couple of FIFO stacks; however, it is impossible to concurrently transfer the information in bidirection between the central processing unit 1 and the input/output unit 2. In other words, concurrent operation of the FIFO stacks 3 and 4 is impossible so that when one FIFO stack is operated, the other must stop its operation. Thus, the operation of the FIFO stacks is extremely inefficient.

SUMMARY OF THE INVENTION

Accordingly, an object of the present invention is to provide an information transferring apparatus being capable of a bidirectional transfer of information by using a single FIFO stack.

According to the present invention, there is provided an information transferring apparatus comprising: a first-in first-out stack to be disposed between first and second information processing units; a first information line for transferring information from the first information processing unit to the second information processing unit through the first-in first-out stack; a second information line for transferring information from the second information unit to the first information unit through the first-in first-out stack; a switching means for selectively deactivating the first and second information lines; and a control means for applying first and second control signals to the switching circuit. With such an arrangement, the switching means operates responsive to the first control signal from the control means to deactivate the second information line while holding the first information line active, and operates responsive to the second control signal from the control means to deactivate the first information line while holding the second information line active.

Other objects and features of the invention will be apparent from the following description taken in conjunction with the accompanying drawings, in which:

BRIEF DESCRIPTION OF THE DRAWING

FIG. 1 is a block diagram of a conventional information processor using a couple of FIFO stacks; and FIG. 2 is a block diagram of an information processor including an information transferring apparatus with a single FIFO stack according to the present invention.

DETAILED DESCRIPTION OF THE PREFERRED EMBODIMENT

Referring now to FIG. 2, there is shown an embodiment of an information transferring apparatus according to the present invention. In FIG. 2, the information processor includes a central processing unit 1, an input/output unit 2 and an information transferring apparatus according to the present invention having a single FIFO stack 11 and disposed between the central processing unit 1 and the input/output unit 2.

In the information processor in FIG. 2, the information from the central processing unit 1 reaches the input/output unit 2 through a route of a switching cirucit SW1, an information line 13, the FIFO stack 11, an information line 14, another switching circuit SW2 and an information output line 15. The information from the input/output unit 2 is transferred to the central processing unit 1 through a route of an information input line 16, a switching circuit SW3, the information line 13, the FIFO stack 11, the information line 14, a switching circuit SW4, and an information line 17. Those switching circuits SW1 to SW4 may be constructed by AND gates, for example. The information transferring apparatus permits a bidirectional transfer of information. As far as the transferring operation is performed, the FIFO stack 11 continues to operate.

Generally, the direction of information transferring between the central processing unit 1 and the input/output unit 2 is determined by setting the information transferring direction of the central processing unit 1, the FIFO stack 11 and the input/output unit 2 in this order. The determination of the transferring direction of information in the central processing unit 1 and the input/output unit 2 requires a relatively long time. Accordingly, it is easy to establish the transferring direction of information in the FIFO stack 11 while the transferring direction in those former cases is set up.

The command register 18 receives a program information from the central processing unit 1 and changes the contents of the bit position X in accordance with the program information received. The contents changed in the bit position X is then used to control the switching circuit SW1 to SW4. Assume now that the program information from the central processing unit 1 causes the command register 18 to have "0" in the bit position X. In this case, the switching circuits SW1 and SW2 are closed to activate the information input line 12, the information lines 13 and 14, and the information output line 15, while the switching circuits SW3 and SW4 are opened to deactivate the information input line 16 and the information output line 17. The result is that the information from the central processing unit 1 is stored in the FIFO stack 11 through the switching circuit SW1 and the information stored in the FIFO stack 11 may be transferred to the input/output unit 2 through the switching circuit SW2. Let us consider now the case where the command register 18 is set to have a bit "1" at the bit position X. In this case, the switching circuits SW3 and SW4 are closed to activate the information input line 16, the information lines 13 and 14, and the information output line 17, while the switching circuits SW1 and SW2 are opened to deactivate the information input line 12 and the information output line 15. This results in that the information from the input/output unit 2 is stored in the FIFO stack through the switching circuit SW3, and the information stored in the FIFO stack may be transferred to the central processing unit 1 through the switching circuit SW4.

While the present invention has been described with a specific embodiment, it is not limited to such an embodiment. In the above-mentioned embodiment, the switching circuits SW1 to SW4 are controlled by using the command register 18 which is controlled through the program information from the central processing unit. Instead of the command register 18, a control means externally controllable may be used to control those switching circuits SW1 to SW4 from exterior. Thus, for example, a manually operable control means can be used for controlling switching circuits SW1 to SW4 instead of command register 18. Similarly, external control circuits can be used for controlling switching circuits SW1 to SW4 instead of command register 18. Further the switching circuits SW1 to SW4 are separately provided, but the switching circuits SW1 and SW3 as well as the switching circuits SW2 and SW4 can be formed as a single switching circuit. In the foregoing description, the information is transferred from the central processing unit 1 through the FIFO stack 11 to the input/output unit 2 and conversely from the input/output unit 2 to the central processing unit 1 through the FIFO stack 11. The transferring of the information may also be performed in the following manner. Through selective operation of those switching circuits SW1 to SW4, the information from the central processing unit 1 is loaded into the FIFO stack 11 while at the same time the information having been stored in the FIFO stack 11 is transferred to the central processing unit 1. Alternatively, the information from the input/output unit 2 is loaded into the FIFO stack 11 while at the same time the information having been stored in the FIFO stack 11 is transferred to the input/output unit 2.

Various other modifications of the disclosed embodiment will become apparent to a person skilled in the art without departing from the spirit and scope of the invention as defined by the appended claims.

What we claim is:

1. An information transferring apparatus disposed between first and second information processing units comprising:

a first-in first-out stack having an input terminal and an output terminal;

a first information line connected between the first information processing unit and said input terminal for transferring information from said first information processing unit to said first-in first-out stack;

a second information line connected between said output terminal and the second information processing unit for transferring information from said first-in first-out stack to said second information processing unit;

a third information line connected between the second information processing unit and said input terminal for transferring information from said second information processing unit to said first-in first-out stack;

a fourth information line connected between said output terminal and the first information processing unit for transferring information from said first-in first-out stack to said first information processing unit;

switching means for selectively deactivating said first to fourth information lines; and control means for applying first and second control signals to said switching means, wherein said switching means operates responsive to the first control signal from said control means to deactivate said third and fourth information lines while holding active said first and second information lines, and operates responsive to the second control signal from said control means to deactivate said first and second information lines while holding active said third and fourth information lines.

2. An information transferring apparatus according to claim 1, wherein said control means for controlling said switching means is a command register which is controlled by program information fed from said first information processing unit.

3. An information transferring apparatus according to claim 1, wherein said control means for controlling said switching means is manually operable.

4. An information transferring apparatus according to claim 1, wherein said control means for controlling said switching means comprises an external control circuit.

* * * * *